April 16, 1929.  R. E. GILLMOR  1,709,395
GYROSCOPIC COMPASS
Filed Feb. 4, 1926
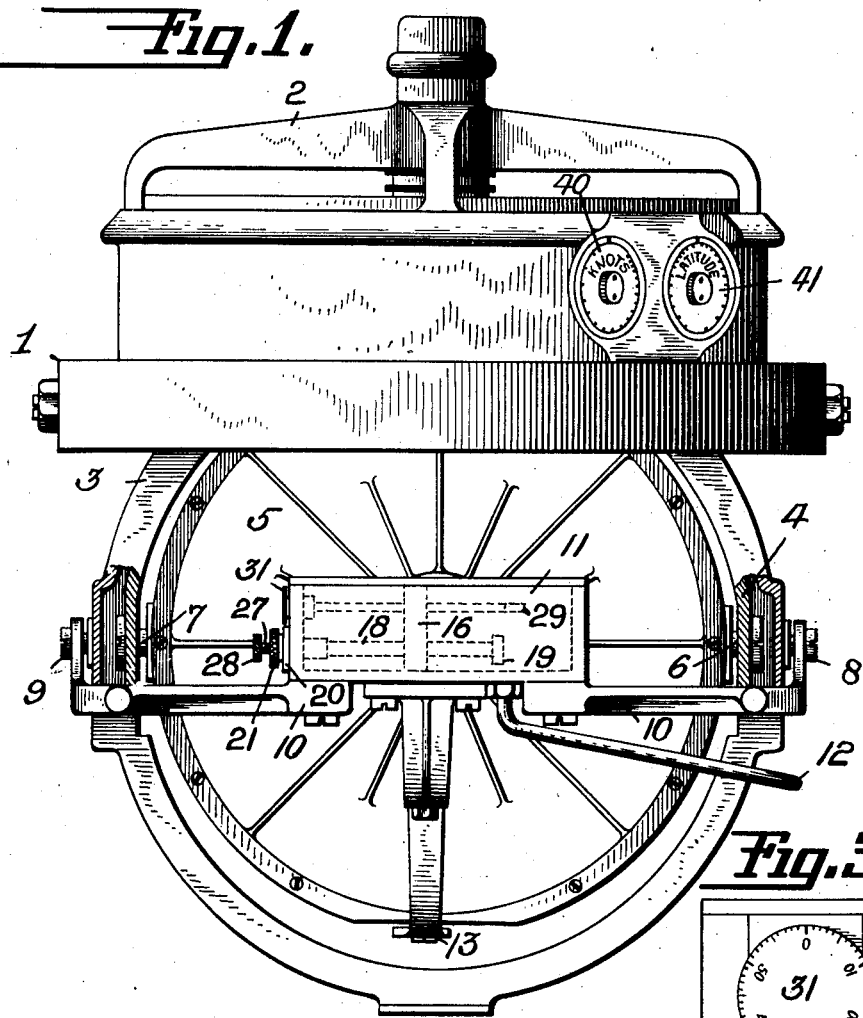
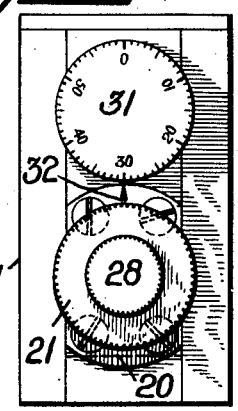
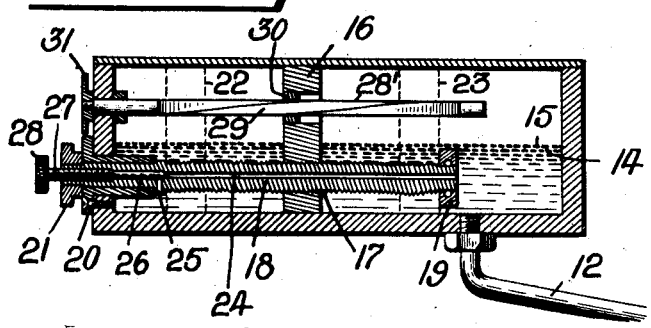
INVENTOR
Reginald E. Gillmor.
BY Herbert H. Thompson
his ATTORNEY.

Patented Apr. 16, 1929.

1,709,395

UNITED STATES PATENT OFFICE.

REGINALD E. GILLMOR, OF STAMFORD, CONNECTICUT, ASSIGNOR, BY MESNE ASSIGNMENTS, TO SPERRY GYROSCOPE COMPANY, INC., OF BROOKLYN, NEW YORK, A CORPORATION OF NEW YORK.

GYROSCOPIC COMPASS.

Application filed February 4, 1926. Serial No. 85,927.

This invention relates to refinements in gyroscopic compasses dealing with the variations in the behavior of the compass due to changing latitudes. It has long been recognized that for the best results the pendulous factor of the gyroscope should be so related to the other factors that on change in speed or coarse of the ship the compass will be brought to its new settling point by the direct action of the acceleration pressure on the gravitational factor so that no oscillations are set up therefrom. This action of the acceleration forces on the compass produces what is known as the ballistic deflection. The permanent change in settling point of the compass for changes in speed and course is usually referred to as the speed and course error, and the aim of the compass engineer should be to make these factors equal. The speed and course error is corrected for in the Sperry compass by the correction device correcting the readings of the compass in accordance with the speed, course and latitude.

It has been found, however, since the speed and course error varies with the latitude, that a pendulous factor of the compass which is designed for a particular latitude, will not give the compass quite the proper ballistic deflection for other latitudes to prevent the setting up of oscillations if the other factors, such as the rotor speed, remain constant. Heretofore it has been the practice to design compasses so that the ballistic deflection is correct for a single mean latitude, leaving a residual uncorrected error for all other latitudes. Also, it is recognized that in the prior patent to Harrison and Rawlings #1,362,940, gyroscopic compasses, December 21, 1920, assigned to the assignees of the present application, means are provided for minimizing this defect to some extent by providing a plurality of gravitational factors which may be used selectively or in combination. In the present invention, however, greater accuracy is secured by providing means for varying the pendulous factor at will and through any desired number of small changes so that the magnitude of the pendulous factor may be as carefully adjusted as any other feature of the compass.

Referring to the drawings in which what is now considered the preferred form of the invention is shown Fig. 1 is an end elevation, partly in section, of a gyro compass of the Sperry liquid control type with my invention applied thereto.

Fig. 2 is a longitudinal section on a large scale of one of the liquid containers forming, together with the liquid therein, the gravitational factor.

Fig. 3 is a side elevation on a still larger scale of the liquid container showing the adjusting means for the same.

While my invention is shown as applied particularly to the Sperry type liquid controlled compass, it will be obvious that the principles therein may be utilized in other types of compasses within the spirit and scope of the appended claims. The Sperry type compass, however, is especially adapted for my invention since the gravitational element therein also applies a damping couple so that when the gravitational factor is varied the damping factor is automatically varied in the same proportion and thereby the percentage damping remains undisturbed.

The compass in Fig. 1 is shown as having the usual gimbal support 1, for the spider 2 from which the compass is suspended, the usual follow-up or phantom ring being shown at 3, the vertical ring at 4 and the gyro rotor casing at 5, the latter being journaled on a horizontal axis 6—7 in a vertical ring. The correction devices referred to hereinbefore are indicated at 40 and 41. Pivoted on the follow-up frame at 8—9 is the gravitational factor shown as in the form of a framework 10 supporting a pair of boxes 11, one on each side of the compass and connected by a tube 12, the whole being connected to a point 13 near the bottom of the gyro case. This connection may be made slightly eccentric for damping purposes, but damping may obviously be secured by other means, as my invention does not relate to damping. The liquid 14, such as mercury, within the boxes, acts as the gravitational factor of the compass. The value or magnitude of the liquid gravitational factor, such as liquid 14, depends primarily on three factors, first, the density or specific gravity of the liquid, second, on the area of the exposed surface 15 of the same, which is in communication with the transfer pipe 12, and third, on the lever arm through which it acts, or in other words, the distance of the center of gravity of the liquid horizontally from the line connecting pivots 8—9.

By my invention, therefore, I vary at least one of these factors for each latitude so that the magnitude of the gravitational factor is at all times just the proper value to give the compass the proper ballistic deflection. For this purpose I prefer to vary the area of what may be termed the working portion or effective area of the liquid. To effect this I provide within each of the boxes 11 a sliding piston 16 with suitable means for adjusting it at will. To this end I may provide the piston with a threaded aperture 17 in which is threaded a rotatable stem or rod 18. Said rod is journaled at one end in a bracket 19 extending across the box and at the other end in the sleeve or bushing 20. To rotate said rod I provide a knurled knob 21 so that the piston may be readily adjusted to any position in the box shown by the dotted line positions 22 and 23. The piston, it will be seen, divides the box into two compartments, the relative size of which may be varied at will and only one of which, namely the right hand compartment in Fig. 2, is in communication with the pipe 12 so that the area of the liquid in this compartment may be varied at will.

In order, however, to prevent a change in the height of the liquid, due to movements of the piston and consequent change in the balance of the compass, I provide a by-pass through or around the piston. This may be provided by boring a small hole 24 through the rod 18 which has a laterally extending passage 25 connected thereto adjacent the outer end. A small needle valve 26 is shown for closing and opening said passage 25 at will, said needle valve having a threaded stem 27 and being rotated by knurled knob 28.

It is also desirable that indicating means be provided, graduated to indicate latitude to show where the piston should be placed for different latitudes. For this purpose I have shown a second rod 28' provided with a very coarse spiral thread 29 making only one complete turn between the limiting positions of the piston, said rod being threaded in a bushing 30 in said piston. To said rod is secured a dial 31 preferably graduated in degrees of latitude and cooperating with a reference line 32 or mark.

In operating my invention, on change of latitude, the operator first opens the needle valve 26 by turning the knob 28, then the knob 21 is turned until the indicator is brought to the proper latitude reading after which the needle valve 26 is again closed. By this procedure the effective area of the mercury is varied at will while permitting at all times an equal amount on both sides of the piston to maintain the compass balance. It will also be readily seen that since the damping is applied through the eccentric connection 13, that any variation in the effective area of the mercury, resulting in the variation in the gravitational torque, would also effect a corresponding change in the damping torque, since both torques are really but a single torque about an inclined axis at right angles to the eccentric connection.

In accordance with the provisions of the patent statutes, I have herein described the principle and operation of my invention, together with the apparatus which I know consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a liquid controlled gyro-compass, the combination with the liquid containers, of a piston slidably mounted therein to vary the effective liquid surface, means for adjusting the same, means forming a by-pass permitting the flow of liquid around said piston, and a valve for closing the same.

2. In a gyro-compass, having a pendulous factor, rotatable means for varying the gravitation moment of said factor through small increments, and a latitude scale adjustable with said means whereby the value of said moment may be varied according to the latitude.

3. In a liquid controlled gyro-compass, the combination with the liquid containers, of a piston slidably mounted therein to vary the effective liquid surface, means for adjusting the same, and a latitude scale cooperating therewith.

4. In a liquid controlled gyro-compass, the combination with the liquid containers, of a piston slidably mounted therein to vary the effective liquid surface, means for adjusting the same, a latitude scale cooperating therewith, a by-pass permitting the flow of liquid around said piston, and a valve for closing the same independently of the action of said adjusting means.

5. In a liquid controlled gyro-compass, the combination with the liquid containers, of a piston slidably mounted therein to vary the effective liquid surface, a threaded rod for adjusting the same, a second threaded rod of larger pitch and adapted to be rotated by movement of said piston, and a latitude scale rotated by said first and second rods respectively.

6. In a liquid controlled gyro-compass, the combination with the liquid containers, of a piston slidably mounted therein to vary the effective liquid surface, a threaded rod for adjusting the same, a by-pass bore through said rod opening on both sides of said piston, and a valve for closing said bore.

7. In a gyroscopic compass, the combination with a gravitational factor which also applies the damping factor, of means for varying the former through small increments whereby the latter is also varied proportionately, and a latitude scale adjustable with said means whereby both the gravitational and damping factors may be varied according to the latitude.

In testimony whereof I have affixed my signature.

REGINALD E. GILLMOR.